United States Patent [19]
Decker et al.

[11] Patent Number: 5,543,464
[45] Date of Patent: Aug. 6, 1996

[54] EPOXY FUNCTIONAL ACRYLIC POWDER COATINGS

[75] Inventors: Owen H. Decker, West Reading; Charles P. Tarnoski, Sinking Spring, both of Pa.

[73] Assignee: Morton International, Inc., Chicago, Ill.

[21] Appl. No.: 569,379

[22] Filed: Dec. 8, 1995

Related U.S. Application Data

[63] Continuation of Ser. No. 318,417, Oct. 5, 1994, abandoned, which is a continuation-in-part of Ser. No. 253,880, Jun. 3, 1994, abandoned.

[51] Int. Cl.$^6$ .................. C08F 8/00; C08L 67/02
[52] U.S. Cl. ............ 525/176; 525/438; 525/533; 525/934; 528/112; 528/297
[58] Field of Search ............... 525/176, 438, 525/533, 934; 528/112, 297

[56] References Cited

U.S. PATENT DOCUMENTS

| | | | |
|---|---|---|---|
| 3,817,946 | 6/1974 | Ree et al. | 260/79 |
| 4,012,363 | 3/1977 | Bruning et al. | 528/308 |
| 4,101,476 | 7/1978 | Schmid et al. | 525/538 |
| 4,155,952 | 5/1979 | McConnell et al. | 525/173 |
| 4,180,527 | 12/1979 | Schmid et al. | 525/115 |
| 4,340,698 | 7/1982 | De Jongh et al. | 525/438 |
| 4,499,239 | 2/1985 | Murakami et al. | 525/111 |
| 4,859,760 | 8/1989 | Light, Jr. et al. | 525/454 |
| 5,242,757 | 9/1993 | Buisine et al. | 428/480 |
| 5,276,097 | 1/1994 | Hoffmann et al. | 525/165 |
| 5,298,355 | 3/1994 | Tyagi et al. | 430/110 |

FOREIGN PATENT DOCUMENTS

WO-14745  10/1991  European Pat. Off. .

*Primary Examiner*—John C. Bleutge
*Assistant Examiner*—Randy Gulakowski
*Attorney, Agent, or Firm*—Wayne E. Nacker; Gerald K. White

[57] ABSTRACT

Coating powder compositions are formulated with epoxy-functional acrylic resins, and as curatives 5 to 50 phr poly-carboxylic functional polyesters and 5 to 40 phr poly-carboxylic functional crystalline curatives.

10 Claims, No Drawings

EPOXY FUNCTIONAL ACRYLIC POWDER COATINGS

This is a continuation of application Ser. No. 08/318,417 filed Oct. 5, 1994 now abandoned which is a continuation-in-part of application Ser. No. 08/253,880, filed Jun. 3, 1994 now abandoned.

The present invention is directed to acrylic coating powders and more particularly to acrylic coating powders which provide coatings having improved impact-resistance.

BACKGROUND OF THE INVENTION

The type of coating powder to which this invention is directed contains as the primary resin a polymer having an acrylic backbone and pendant epoxy functionality. Such polymers are formed, for example, from glycidyl esters of acrylic acids, and generally, additional unsaturated co-monomers. The coating powder also contains an epoxy-reactive curative, generally a crystalline multi-functional carboxylic acid, such as dodecanedioic acid. The coating powders may be clear, i.e., unfilled, or may contain fillers and pigments.

While the coatings formed from these coating powders exhibit high gloss and weatherability, a general disadvantage of the coatings is that they exhibit poor flexibility and impact resistance. It is a general object of the present invention to improve the flexibility and impact resistance of coatings formed from epoxy-functional acrylic coating powders.

U.S. Pat. Nos. 3,817,946 and 3,857,905, the teachings of which are each incorporated herein by reference, describe coating compositions containing an epoxy functional acrylate, an acid-functional polyester and a dicarboxylic acid. The compositions of this type described in these patents would not, however, have significant commercial utility as the polyester resins used therein have low melt onset temperatures, i.e., about 31°–32° C., which would result in sintering of the coating powder (agglomeration of particles) during typical storage conditions, rendering the powder unfit for coating purposes.

SUMMARY OF THE INVENTION

In accordance with the present invention, coating powders comprise an acrylic resin having epoxy equivalent weights of between about 200 and about 650; between about 5 and about 50 phr (parts per hundred resin, weight basis, relative to epoxy-functional acrylic resin) of a semi-crystalline polyester having poly-carboxylic acid functionality, a melt onset temperature of between about 45° C. and about 120° C., and a crystallinity of between about 20 and about 300 J/gm.; and between about 5 and about 40 phr of a crystalline curative having poly-carboxylic acid functionality. The total carboxylic acid functionality is between about 0.8 and about 1.2 times the epoxy functionality of the acrylic resin.

DETAILED DESCRIPTION OF CERTAIN PREFERRED EMBODIMENTS

Herein, unless otherwise stated, all amounts are expressed by weight and the term "phr" is a weight measurement which relates to the amount of epoxy-functional acrylic polymer (as 100 parts) in the coating powder.

The epoxy-functional polymer may be produced by polymerizing epoxy-functional acrylates, e.g., glycidyl esters of acrylic acids, alone or in conjunction with other vinyl monomers, including other acrylic esters, styrene and substituted styrenes. The use of monomers having epoxy-reactive chemical groups, such as carboxylic acid and hydroxyl groups are avoided. Production, e.g. solution polymerization, of glycidyl-containing acrylic polymers of this type are described, for example, in U.S. Pat. No. 4,499,239, the teachings of which are incorporated herein by reference. Alternatively, an acrylic polymer having carboxylic acid functionality may be formed and epoxy-containing species subsequently grafted thereto. Glycidyl-containing acrylic polymers are also commercially available, e.g. resins sold under the trademark Almatex PD-6100, PD-7690 and PD-7610 by Anderson Development Co.

Epoxy-functional acrylates useful in the invention have epoxy equivalent weights of between about 200 and about 650, preferably in the range of about 300 to 600. If Epoxy-functional acrylates having higher epoxy equivalent weights are used, coatings are formed with poor impact resistances, both direct and reverse. Total molecular weights (number average) of the epoxy-functional acrylates range from about 500 to about 20,000, preferably between about 2000 and about 10,000. The epoxy-functional acrylate should have a $T_g$ of at least about 40° C., preferably above about 50° C., and a melting point of from about 80° C. to about 200° C., preferably from about 100 ° to about 150° C.

Semi-crystalline polymers useful in accordance with the invention are described, for example, in International patent application WP 91/14745. Semi-crystalline polymers exhibit a heterogeneous morphology, i.e., crystalline and amorphous phases; and are typically opaque at ambient temperatures.

Specifically, a suitable semi-crystalline polyester is one with an onset of melt of between about 45° C. and about 120° C., preferably between about 55° C. and about 90° C., one or more $T_g$ values less than 55° C., a melting point of 50° C. to 200° C., preferably 60° to 130° C., an acid value of from 10 to 250 mg KOH per gram, a hydroxy number of no more than 11 mg KOH per gram and a number average molecular weight of between 600 and 20,000, preferably between 1200 and 2000. The melting behavior of the semi-crystalline polyester, particularly the temperature of the onset of melt are particularly critical to forming a useful coating powder in accordance with the invention. If the temperature at which the powder form of the coating is shipped, stored or handled is above the temperature of the onset of melt, sintering will occur, causing problems such as blocking of the boxed powder and impact fusion or stickiness in handling equipment. Too low a molecular weight of the polyester may result in a coating inferior in impact resistance and/or flexibility. Too high molecular weight polyesters tend to result in cloudiness and surface imperfections such as craters, fisheyes and pinholes in the cured coating powder.

Melt temperature and the temperature of the onset of melt are also of importance in the grinding of the extrudate chips into powder. Compositions containing semi-crystalline polyesters with an onset of melt below 45° C. are especially sensitive to fusing (melting of the coating powder) during grinding. Compositions containing semi-crystalline polyesters with an onset of melt above 45° C. give less problems, and those containing semi-crystalline polyesters with melt onsets of 55° C. or above show no tendency to fuse during grinding.

Another handling issue related to the semi-crystalline polyester is the speed with which the melt extrudate hardens into a friable mass after extrusion. Semi-crystalline polyester properties which speed hardening are high melt temperature, high degree of crystallinity and high crystallization rate. Factors which slow hardening are low melt temperature, low degree of crystallinity, and low crystallization rate. The crystallinity of the polyester should be between about 20 and about 300 J/gm, preferably between about 60 and about 200 J/gm to impart stability to the powder and flexibility to the cured coating.

The structural features of the semi-crystalline polyesters which are presumed to impart flexibility and impact resistance to the coating are the polymer chain elements which provide free rotation around backbone bonds. For example, free rotation about the backbone bonds of 1,6-hexanediol dodecanedioate residues gives the polymer high flexibility in amorphous states, such as when the polymer is molten, or when it is cross-linked into a coating network. This same linear aliphatic structure provides the crystallinity which allows the polyester to crystallize in extrudate chips and in un-cured powder.

The semi-crystalline polyesters of this invention are based on a polycondensation reaction of (cyclo) aliphatic and/or aromatic polyols with (cyclo) aliphatic and/or aromatic polycarboxylic acids or anhydrides, esters or acid chlorides based on these acids, using an excess of acid over alcohol so as to form a polyester with an acid number of at least 10, preferably from about 10 to about 250, and more preferably from about 60 to about 90, and with a hydroxyl number preferably less than 11. Examples of suitable polyols include 1,2-ethanediol, 1,3-propanediol, 1,4-butanediol, diethylene glycol, 1,6-hexanediol, neopentyl glycol, 1,10-decanediol, 1-4-cyclohexanedimethanol, trimethylolpropane, 2-methyl-1,3-propanediol, hydrogenated bisphenol A (or 2,2-(dicyclohexanol)propane), 2,2,4-trimethyl-1,3-pentanediol, 2-n-butyl-2-ethyl-1,3-propane-diol, 3-hydroxy-2,2-dimethylpropyl 3-hydroxy- 2,2-dimethylpropanoate (CA. Reg. No.= 115-20-4), and 1,12-dodecanediol. Suitable polycarboxylic acids which may be used include succinic acid, adipic acid, azelaic acid, sebacic acid, 1,12-dodecanedioic acid, terephthalic acid, isophthalic acid, trimesic acid, tetrahydraphthalic acid, hexahydrophthalic acid, 1,4-cyclohexanedicarboxylic acid, trimellitic acid and naphthalene dicarboxylic acid.

Particularly suitable polyesters are formed from $C_6-C_{12}$ aromatic and/or aliphatic dicarboxylic acids and diols. One particularly suitable polyester is a copolymer of hexanediol and 1,12-dodecanedioic acid. Such polyesters have onset of melt temperatures of about 55° C.

The acid functional polyester comprises a portion of the curing agent, with the crystalline poly-carboxylic acid functional monomer comprising the remainder of the curing agent. The polyester provides flexibility to the coating, thereby improving its impact resistance.

The monomer curative may be any acid, aliphatic or aromatic having an acid functionality of 2 or greater. Example of suitable poly-functional acid monomers are those listed above with respect to polyester formation and mixtures of such monomers. A currently preferred monomer is 1,12-dodecanedioic acid.

The coating powder may be clear, i.e., non-pigment-loaded, or may contain up to 200 wt% (though generally 120 wt% or less) of filler and/or pigment, relative to the weight of the total of the epoxy-functional polymer, the polyester and monomer curative. Filled compositions typically contain at least about 10 wt% filler and/or pigment, relative to the total of epoxy-functional polymer, polyester and monomer. In addition, the coating composition may contain conventional additives, e.g., antioxidants, light stabilizers, flow modifiers, costabilizer, etc., generally at a total level of about 10 phr or less.

Coating powders in accordance with the present invention are formed in a conventional manner. The components of the coating powder are combined and blended for not more than 5 minutes, to blend well. The blended materials are then extruded, e.g., at 120° C. in a Buss single screw extruder, allowed to cool, chipped, ground and screened to obtain a powder of appropriate particle size. Average particle size is typically 20–80 microns. Scalping at 100 mesh is typical to remove coarse particles. There is typically about 10% by weight of particles below 10 microns. The amount of material retained on a 325 mesh is typically between about 30 and 50 wt.%. The powder is then applied in a conventional manner, e.g., electrostatically, to a substrate. The substrate is heated at the time of application and/or subsequently so that the coating particles melt, form a continuous film, and cure.

The invention will now be described in greater detail by way of specific examples.

EXAMPLES

Examples #19, A,B,C,D,F,G,H,I, and J are comparative; examples E,K,L and M are in accordance with the present invention.

The following reagents were used in this work.

Adipic Acid - Dupont, High Purity

Almatex PD-6100 - Anderson Development Company

Almatex PD-7610 - Anderson Development Company

Almatex PD-7690 - Anderson Development Company 1,4-Butanediol - Aldrich, 99%

Dodecanedioic Acid - Dupont, Resin Grade (DDDA)

1,6-Hexanediol - BASF, Resin Grade

Nitrogen - MG Industries, Prepurified

Novacite 1250 - Malvern Minerals Co.

R-960 $TiO_2$ - Dupont

Terephthalic Acid - Amoco, Resin Grade TA-22

Trimethylolpropane - Hoechst Celanese, Resin Grade

PROCEDURES

Synthesis of Flexibilizers (polyesters)

Flexibilizer 1a

Adipic acid, (1257.8 g, 8.606 moles), 1,4-butanediol (700.0 g, 7.767 moles) and hydrated monobutyltin oxide (Fascat 4100, 1.96 g) were combined in a 3 liter glass kettle equipped with a thermocouple, a stirrer, a nitrogen gas inlet, and a partial condenser topped with a distilling head. The stirred reaction mixture was heated rapidly to 150° C., whereupon water began to distill from the system. Heating was continued, with the temperature rising to 210° C. over four hours, then held at 210° C. for eight hours.

At this point 237 ml of water had collected. The polymer, a clear mobile liquid was discharged into a teflon-coated tray, and allowed to cool, yielding a brittle, white wax with the following properties:

Acid number: 65.8 mg KOH/g

Melt onset (DSC): 32° C.

Melt maximum (DSC): 50° C.

Heat of fusion: 73 J/g

Flexibilizer 1b

Dodecanedioic acid (900.0 g, 3.908 moles), 1,6-hexanediol (373.1 g, 3.157 moles), and hydrated monobutyltin oxide (Fascat 4100, 0.64 g) were combined in a 2 liter glass kettle equipped with a thermocouple, a stirrer, a nitrogen gas inlet, and a partial condenser topped with a distilling head. The stirred reaction mixture was heated rapidly to 150° C., whereupon water began to distill from the system. Heating was continued, with the temperature rising to 220° C. over 3.5 hours, then held at 220° C. for 4.0 hours.

At this point 106 ml of water had collected. The polymer, a clear mobile liquid was discharged into a teflon-coated tray, and allowed to cool, yielding a brittle, white wax with the following properties:

Acid number: 76.8 mg KOH/g
Melt onset (DSC): 55° C.
Melt maximum (DSC): 74° C.
Heat of fusion: 121 J/g Flexibilizer 1c Adipic acid, (555.6 g, 3.802 moles), 1,6-hexanediol (400.0 g, 3.385 moles) and hydrated monobutyltin oxide (Fascat 4100, 0.95 g) were combined in a 3 liter glass kettle equipped with a thermocouple, a stirrer, a nitrogen gas inlet, and a partial condenser topped with a distilling head. The stirred reaction mixture was heated rapidly to 150° C., whereupon water began to distill from the system. Heating was continued, with the temperature rising to 200° C. over two hours, then held at 200° C. for two hours.

At this point 105.5 ml of water had collected. The polymer, a clear mobile liquid was discharged into a teflon-coated tray, and allowed to cool, yielding a brittle, white wax with the following properties:

Acid number: 70.6 mg KOH/g
Melt onset (DSC): 32° C.
Melt maximum (DSC): 55° C.
Heat of fusion: 90 J/g Flexibilizer 1d Dodecanedioic acid, (1000.0 g, 4.342 moles), 1,6-hexanediol (305.3 g, 2.584 moles), neopentyl glycol (115.3 g, 1.107 moles) and hydrated monobutyltin oxide (Fascat 4100, 0.70 g) were combined in a 2 liter glass kettle equipped with a thermocouple, a stirrer, a nitrogen gas inlet, and a partial condenser topped with a distilling head. The stirred reaction mixture was heated rapidly to 160° C., whereupon water began to distill from the system. Heating was continued, with the temperature rising to 220° C. over 3.5 hours, then held at 220° C. for 3.5 hours.

At this point 115 ml of water had collected. The polymer, a clear mobile liquid was discharged into a teflon-coated tray, and allowed to cool, yielding a brittle, white wax with the following properties:

Acid number: 60.5 mg KOH/g
Melt onset (DSC): 36° C.
Melt maximum (DSC): 61° C.
Heat of fusion: 79 J/g Flexibilizer 1e Adipic acid, (1079.3 g, 7.385 moles), 1,6-hexanediol (800.0 g, 6.769 moles), trimethylolpropane (18.17 g, 0.135 moles) and hydrated monobutyltin oxide (Fascat 4100, 0.90 g) were combined in a 2 liter glass kettle equipped with a thermocouple, a stirrer, a nitrogen gas inlet, and a partial condenser topped with a distilling head. The stirred reaction mixture was heated rapidly to 160° C., whereupon water began to distill from the system. Heating was continued, with the temperature rising to 220° C. over two hours, then held at 220° C. for four hours.

At this point 225 ml of water had collected. The polymer, a clear mobile liquid was discharged into a teflon-coated tray, and allowed to cool, yielding a brittle, white wax with the following properties:

Acid number: 38.9 mg KOH/g
Melt onset (DSC): 38° C.
Melt maximum (DSC): 57° C.
Heat of fusion: 71 J/g Flexibilizer 1f Dodecanedioic acid (834.8 g, 3.625 moles), adipic acid (529.7 g, 3.625 moles), 1,6-hexanediol (800.0 g, 6.769 moles), and hydrated monobutyltin oxide (Fascat 4100, 2.16 g) were combined in a 2 liter glass kettle equipped with a thermocouple, a stirrer, a nitrogen gas inlet, and a partial condenser topped with a distilling head. The stirred reaction mixture was heated rapidly to 150° C., whereupon water began to distill from the system. Heating was continued, with the temperature rising to 205° C. over 4.5 hours, then held at 220° C for 2.0 hours.

At this point 215 ml of water had collected. The polymer, a clear mobile liquid was discharged into a teflon-coated tray, and allowed to cool, yielding a brittle, white wax with the following properties:

Acid number: 38.3 mg KOH/g
Melt onset (DSC): 45° C.
Melt maximum (DSC): 63° C.
Heat of fusion: 88 J/g Preparation of Powder Coatings Examples A–M The components listed in Tables 1 and 3 for each formulation were ground, sieved through a 4-mesh screen, bag blended and extruded through a twin-screw 16 mm extruder with chilling of the feed zone and heating of the front zone to 100° C. The extrudate was chilled, chipped and ground, then electrostatically coated on 0.032" thick "Q" panels of cold rolled steel. The coated panels were cured 15 minutes at 375° F., and allowed to air-cool to room temperature before testing. Properties were measured on panels coated to between 1.8 and 2.2 mils. See Tables 2 and 4 for properties.

TABLE 1

REPLICATION OF THE PRIOR ART

| Component (phr) | U.S. Pat. No. 3,817,946 Example 19 | Example A | Example B | Example C |
|---|---|---|---|---|
| Terpolymer* | 100 | — | — | — |
| Almatex PD 6100** | — | 100 | 100 | 100 |
| Modaflow | 1.5 | — | — | — |
| Resiflow ® P67 | — | 1.5 | 1.5 | 1.5 |
| Butanediol Adipate (1a) | 10.7 | — | 10.7 | — |
| Hexanediol Dodecanedioate (1b) | — | — | — | 10.7 |
| Castorwax | 3.25 | — | — | — |
| Titanium Dioxide | 48.1 | 48.1 | 48.1 | 48.1 |
| Carbon Black | 0.42 | 0.42 | 0.42 | 0.42 |
| Stannous Stearate | 0.084 | 10.10 | — | — |
| Stannous Octoate | — | 0.084 | 0.084 | 0.084 |
| Sebacic Acid | 7.2 | 10.10 | 8.84 | 8.84 |
| Sintering*** | — | 3 | 5 | 3 |
| ⅛" Mandrel Bend | PASS | Gross Failure (Full length splits with disbonding) | Pass | Marginal Failure (Edge splits) |
| Impact Resistance (Inch-lbs) Direct/Reverse | not mentioned | 20/Fail | 40/Fail | 20/Fail |

*Example 3 of U.S. Pat. No. : epoxy equivalent wt. 1240; Tg 46° C.
**Glycidyl Methacrylic modifiedl acrylic: epoxy equivalent weight 1000; Tg 58° C.
***Scale from 1 (no sintering) to 10 (fused lump). Values 5 or above are unacceptable.

TABLE 2

EFFECT OF ACRYLIC RESIN ON IMPACT RESISTANCE

| Component | Example D | Example E |
|---|---|---|
| PD-6100 | 80.5 | — |
| PD-7690 | — | 72.9 |
| DDDA | 7.38 | 16.1 |
| Resiflow P-67 | 2.0 | 2.0 |
| Raven 22 | 2.0 | 2.0 |
| Flexibilizer 1b | 12.1 | 10.9 |
| Sintering | 4 | 4 |
| ⅛" Mandrel Bend | Pass | Pass |
| Impact Resistance (Inch-lbs) Direct/Reverse | 40/Failure | 160/160 |

TABLE 3

FORMULATIONS FOR THE SINTERING STUDY

| Component | F | G | H | I | J | K | E | L | M |
|---|---|---|---|---|---|---|---|---|---|
| PD-7610[1] | — | 68.2 | 74.8 | — | — | — | — | — | — |
| PD-7690[1] | 80.3 | — | — | 72.7 | 72.3 | 63.8 | 72.9 | 72.9 | 75.0 |
| DDDA | 19.7 | 19.8 | 14.8 | 16.4 | 16.8 | 13.9 | 16.1 | 16.1 | 17.0 |
| Resiflow P-67 | 2.0 | — | — | 2.0 | 2.0 | 1.4 | 2.0 | 2.0 | 2.0 |
| Troy EX-486 | — | 1.0 | 1.0 | — | — | — | — | — | — |
| Raven 22 | 2.0 | — | — | 2.0 | 2.0 | 2.0 | 2.0 | 2.0 | 2.0 |
| R-960 TiO$_2$ | — | — | — | — | — | — | — | 50.0 | — |
| Novacite 1250 | — | — | — | — | — | — | — | — | 30.0 |
| 1a | — | — | 10.5 | — | — | — | — | — | — |
| 1b | — | — | — | — | — | — | — | 10.9 | 8.0 |
| 1c | — | 12.0 | — | — | — | — | — | — | — |
| 1d | — | — | — | 10.9 | — | — | — | — | — |
| 1e | — | — | — | — | 10.8 | — | — | — | — |
| 1f | — | — | — | — | — | 22.3 | — | — | — |

[1] PD 7610 and PD 7690 are very similar, both having a $T_g$'s of 49° C. and having epoxy equivalent weights of 510 and 470, respectively. Non-flexibilized unfilled GMA-acrylics based on PD 7610 typically exhibit sintering values of 4.

TABLE 4

THE DEPENDENCE OF SINTERING ON FLEXIBILIZER MELT ONSET

| Property | F | G | H | I | J | K | E | L | M |
|---|---|---|---|---|---|---|---|---|---|
| Flexibilizer Melt Onset (°C.) | — | 32 | 32 | 36 | 38 | 45 | 55 | 55 | 55 |
| Sintering | 4 | 8 | 8 | 6 | 6 | 4 | 4 | 4 | 4 |

TABLE 4-continued

THE DEPENDENCE OF SINTERING ON FLEXIBILIZER MELT ONSET

| Property | Example | | | | | | | | |
|---|---|---|---|---|---|---|---|---|---|
| | F | G | H | I | J | K | E | L | M |
| 1/8" Mandrel Bend | Fail | Pass | Pass | Pass | Pass | Pass | Pass | Pass | Pass |
| Impact Resistance | 40/Fail | 160/160 | 160/160 | 80/40 | 160/120 | 160/160 | 160/160 | 160/160 | 120/40 |
| (Inch-lbs) | | | | | | | | | |
| Direct/Reverse | | | | | | | | | |

RESULTS AND DISCUSSION

Replication of Prior Art

The formulation of powder coating Example 19 from U.S. Pat. No. 3,817,946 is listed in Table 1 along with selected properties of the coating. The base resin of the binder system is "Terpolymer of Example 3" (of the '946 patent), a GMA acrylic resin with an epoxy equivalent weight of 1240 and a glass transition temperature of 46° C. The curing agent is sebacic acid, and the flexibilizer and co-curing agent is a butanediol adipate polyester with an equivalent weight of 815.

Listed also in Table 1 are Examples A and B, versions of Example 19 using a different GMA acrylic with and without the flexibilizer. Minor differences between the components used in the present work, and those described in U.S. Pat. No. 3,817,946 can be noted. Probably the most significant differences are that the GMA acrylic, Almatex PD 6100, has an epoxy equivalent weight of 1000 and a $T_g$ of 58 while the "Terpolymer of Example 3" has an equivalent weight of 1240 and a $T_g$ of 46. In addition, a leveling aid, glyceryl tris(12-hydroxystearate), or Castorwax was deleted from Examples A–C.

Flexibility and Impact Resistance

As was noted in U.S. Pat. No. 3,817,946, addition of the flexibilizer butanediol adipate did improve the flexibility of the coating. Example A, the unflexibilized version, failed the flexural test, in which a panel is bent around a 1/8" mandrel. Example B, the flexibilized version, passed the test.

Impact resistance was also improved, but only slightly, increasing from 20/Fail inch-lbs (direct/reverse), to 40/Fail. This improvement is practically negligible, considering that most commercial powder coatings exhibit impact resistance of 160/160 inch-lbs.

Sintering

Although the addition of butanediol adipate flexibilizer improved the flexibility of the GMA-acrylic coating, allowing Example B to pass the mandrel bend test, it also increased the tendency of the powder to sinter, during storage.

In the sintering test a powder sample is heated to 110° F. (43° C.) under a specified load and the sintering evaluated on a scale of 1 to 10. If no sintering is observed, the sample rates 1, while if the sample fuses to a solid lump that is not recognizable as having once been a coating powder, it rates a 10. Values 5 or above are usually unacceptable, as they are prone to sintering during shipping and storage, and to impact fusion during application. In this test, Example A sintered slightly, scoring 3, while the flexibilized version, Example B, sintered significantly and scored 5.

Reduced Sintering in Formulations with GMA-Acrylic Resins of Relatively High Epoxy Equivalent Weight Also included in Table 1 is Example C, a formulation in which the butanediol adipate flexibilizer of Example B is replaced by a hexanediol dodecanedioate of similar equivalent weight. The tendency of the powder to sinter is reduced by this substitution, sintering dropping from 5 back to the 3 of the unflexibilized Example A.

The difference in sintering behavior of Example B and C is caused by the difference in the melting points of the polyesters. Butanediol adipate (Flexibilizer 1a) has an onset of melting of 32° C., well below the temperature of the sintering test of 43° C., while the onset of melting of hexanediol dodecanedioate (Flexibilizer 1b) occurs at about 55° C., safely above the temperature of the sintering test.

Although the substitution of flexibilizers in Example C gives a powder with good sintering resistance, flexibility and impact resistance are both below the standard of typical powder coatings.

Reduced Sintering with Increased Flexibility and Impact Resistance in Formulations with GMA-Acrylic Resins of Relatively Low Epoxy Equivale nt Weight During the search for non-sintering, flexible GMA-acrylic coatings, it was discovered that the use of GMA-acrylic resins with lower equivalent weights than those described in U.S. Pat. No. 3,817,946 led to coatings with high flexibility and impact resistance. Data in Table 2 illustrates this discovery.

The first entry in Table 2, Example D, is a control formulation using Almatex PD-6100, the GMA acrylic resin with an epoxy equivalent weight of 1000. Although there are formulation differences compared to the A-B-C series, notably the absence of $TiO_2$ and the substitution of 1,12-dodecanedioc acid for sebacic acid, sintering resistance is similarly good and impact resistance is similarly poor.

In contrast, when the PD-6100 acrylic resin is replaced in Example E with PD-7690, which has an epoxy equivalent weight of only 470, impact resistance rose to 160/160 inch-lbs.

Sintering a Consequence of Flexibilizer Melt Temperature

In Experiments B and C above, using PD-6100 GMA-acrylic resin of high equivalent weight, sintering susceptibility was seen to depend on the choice of flexibilizer. Similar results were obtained with GMA-acrylics of low equivalent weight. Tables 3 and 4 illustrate this work.

Formulation F in Tables 3 and 4 shows the sintering expected of a low equivalent weight GMA-acrylic coating to which no flexibilizer has been added. Formulations G and H illustrate that sintering becomes much worse when flexibilizers are used if the flexibilizers exhibit a melt onset at 32° C. Formulations I and J, whose flexibilizers begin to melt at 36° C. and 38° C., respectively, sinter to a lesser extent than G and H, while formulations K and E, whose flexibilizers begin to melt at 45° and 55° C., show minimal sintering typical of the unflexibilized formulation F. Examples L and M are included to show that flexibility, impact resistance, and sintering resistance are retained even in the presence of quantities of pigment or filler.

EXAMPLES N–Q

Effect of Epoxy Equivalent Weight (EEW) on Impact Strength

Powder coatings were prepared as per examples D and E above and used to form coatings as described above with respect to D and E. Epoxy equivalent weights in Specimens N–Q were adjusted by appropriate mixtures of Almatex PD-6100 and PD-7610, each described above. Results are shown in Table 5 below.

TABLE 5

| EX-AMPLE | D | N | O | P | Q | E |
|---|---|---|---|---|---|---|
| EEW | 1000 | 800 | 700 | 650 | 600 | 470 |
| ⅛" Mandrel Bend | pass | pass | pass | pass | pass | pass |
| Impact (Dir/Rev) | 40/fail | 20/fail | 60/fail | 80/60 | 140/60 | 160/160 |
| MEK (1–5*) | 5 | 5 | 5 | 5 | 5 | 5 |
| Pencil Hardness (Mar/Gouge) | F/H | F/H | F/H | F/H | F/H | F/H |
| Smoothness (1–10*) | 8 | 8 | 8 | 8 | 8 | 8 |

*Desired Value

At an EEW of 700, the coating failed the reverse impact test. At an EEW of 650, adequate impact strengths, both direct and reverse were obtained. Even better results were achieved at EEWs of 600 or below.

While the invention has been described in terms of certain preferred embodiments, modifications obvious to one with ordinary skill in the art may be made without departing from the scope of the invention.

Various features of the invention are recited in the following claims.

What is claimed is:

1. A composition comprising
   A) an epoxy-functional acrylate polymer having an epoxy equivalent weight of between about 200 and about 650,
   B) between about 5 and about 50 phr of a semi-crystalline polyester having poly-carboxylic acid functionality, a melt onset temperature of between about 45° C. and about 120° C., and a crystallinity of between about 20 J/gm. and about 300 J/gm. and
   C) between about 5 and about 40 phr of a crystalline curative having poly-carboxylic acid functionality;
   the total carboxylic acid functionality of B) and C) being between about 0.8 and about 1.2 times the epoxy functionality of the acrylic resin.

2. A composition in accordance with claim 1 in particulate form suitable as a coating powder.

3. A composition in accordance with claim 1 wherein said polyester has a melt onset temperature of between about 55° C. and about 90° C.

4. A composition in accordance with claim 3 wherein said polyester has a crystallinity of between about 60 J/gm. and about 200 J/gm.

5. A composition in accordance with claim 1 wherein said polyester has a crystallinity of between about 60 J/gm. and about 200 J/gm.

6. A composition in accordance with claim 1 wherein said polyester has a number average molecular weight of between about 600 and about 20,000.

7. A composition in accordance with claim 1 wherein said polyester has a number average molecular weight of between about 1200 and about 2000.

8. A composition in accordance with claim 1 wherein said epoxy-functional acrylate polymer has an epoxy equivalent weight of between about 200 and about 600.

9. A composition in accordance with claim 1 wherein said epoxy-functional acrylate polymer has an epoxy equivalent weight of between about 300 and about 600.

10. A composition in accordance with claim 1 wherein said crystalline curative C) is dodecanedioic acid.

\* \* \* \* \*